United States Patent [19]
Sudo et al.

[11] Patent Number: 5,502,581
[45] Date of Patent: Mar. 26, 1996

[54] HOLOGRAM MANUFACTURING METHOD AND APPARATUS

[75] Inventors: Toshiyuki Sudo, Atsugi; Naosato Taniguchi, Machida; Hideki Morishima, Atsugi, all of Japan

[73] Assignee: Canon Kabushiki Kaisha, Tokyo, Japan

[21] Appl. No.: 345,357

[22] Filed: Nov. 18, 1994

Related U.S. Application Data

[63] Continuation of Ser. No. 980,967, Nov. 24, 1992, abandoned.

[30] Foreign Application Priority Data

Nov. 26, 1991 [JP] Japan .................................. 3-310893

[51] Int. Cl.⁶ ............................... G03H 1/04; G03H 1/30
[52] U.S. Cl. ........................ 359/10; 359/11; 359/21; 359/25; 359/30
[58] Field of Search .................. 359/1, 9, 11, 22, 359/24, 30, 35, 15, 21, 17, 10, 25

[56] References Cited

U.S. PATENT DOCUMENTS

| | | | |
|---|---|---|---|
| 3,567,305 | 3/1971 | Collier et al. | 359/11 |
| 3,798,618 | 3/1974 | Oshida | 359/22 |
| 3,807,829 | 4/1974 | Close | 350/3.5 |
| 4,455,061 | 6/1984 | Case | 359/17 |
| 4,498,740 | 2/1985 | Caulfield | 359/9 |
| 4,964,684 | 10/1990 | Iovine | 359/23 |
| 5,016,951 | 5/1991 | Deason et al. | 350/3.67 |
| 5,040,864 | 8/1991 | Hong | 385/16 |

FOREIGN PATENT DOCUMENTS

| | | | |
|---|---|---|---|
| 0298145 | 1/1989 | European Pat. Off. | G03H 1/26 |
| 0450644 | 10/1991 | European Pat. Off. | |

*Primary Examiner*—Martin Lerner
*Attorney, Agent, or Firm*—Fitzpatrick, Cella, Harper & Scinto

[57] ABSTRACT

A hologram manufacturing apparatus and a hologram manufacturing method for manufacturing a hologram optical device by a split exposure method are disclosed. The manufacturing apparatus comprises light shield means having a spatial light modulator having a light transparent area and a light non-transparent area thereof controlled corresponding to an input signal, and drive means for driving the spatial light modulator by supplying the signal to the spatial light modulator. The light shield means is arranged closely to a photosensitive material.

9 Claims, 7 Drawing Sheets

HOLOGRAM MANUFACTURING METHOD AND APPARATUS

This application is a continuation of application Ser. No. 07/980,967 filed Nov. 27, 1992, now abandoned.

BACKGROUND OF THE INVENTION

1. Field of the Invention

A present invention relates to a hologram manufacturing apparatus and a hologram manufacturing method. More specifically, the invention relates to a step and repeat exposure method used in the hologram manufacturing apparatus and method of manufacture.

2. Related Background Art

A hologram optical element is generally a diffraction grating which is manufactured in a manner to record an interference fringe due to light on a photosensitive material. The element is used for the purpose of condensing, focusing and spectrometering light, and includes a hologram lens, a holographic headsup display and a holographic helmet mounted display. In the prior art, the hologram optical element has been manufactured using a two-beam exposure method. However, when the hologram optical element manufactured by the two-beam exposure method is used as a focusing element, aberration occurs and a correction of the aberration is needed.

As one method of correcting the aberration, a hologram manufacturing method for manufacturing a hologram optical element by a step and repeat exposure method has been proposed. In this hologram manufacturing method, a hologram plane is divided into a plurality of appropriate areas in a design step of the hologram optical element. An optimum exposure optical system is designed for each area. An aperture for each area for control of light exposure is formed by a light shielding plate having an aperture of a specific shape. Finally, a laser light source is moved to an optimum position. Those steps are repeated. This hologram manufacturing method increases freedom of design, and it is considered a hologram manufacturing method which greatly contributes to the improvement of the aberration characteristics of a hologram optical element.

FIG. 1 shows a schematic configuration of a prior art hologram manufacturing apparatus for manufacturing a hologram optical element by the step and repeat exposure method.

This hologram manufacturing apparatus is disclosed in U.S. Pat. No. 3,807,829 and comprises a fixing table 101, an L-shaped lateral turntable 103 having a bottom thereof mounted on the fixing table 101 through a lateral turning member 102. The apparatus also comprises a longitudinal turning member 104 mounted on a side of the lateral turntable 103, and an L-shaped exposure table 105 having a side thereof mounted on the longitudinal turning member 104. Two apertured holders $106_1$ and $106_2$ are fixed to the exposure table 105 to face each other, and a photosensitive material 107 is sandwiched and fixed between the two apertured holders $106_1$ and $106_2$. When the photosensitive material 107 is to be exposed to light, a laser object light LB is deflected by first and second movable mirrors 108 and 109 so that it is always directed to a beam expander 110. The laser object light LB after being condensed by the beam expander 110 is directed to the photosensitive material 107 through a pin-hole 111. An angle of incidence of the laser object light LB to the beam expander 110 at the second mirror 109 is adjusted by two angle adjustment knobs $112_1$ and $112_2$. The beam expander 110 and the pin-hole 111 are mounted on a movable stage 113 which is movable by two coarse adjustment knobs $114_1$ and $114_2$ and three fine adjustment knobs $115_1$ to $115_3$ so that the laser object light LB can be directed to any point on the photosensitive material 107. A reference light (not shown) is directed to the photosensitive material 107 from the opposite side to the beam expander 110 and the pin-hole 111.

In this hologram manufacturing apparatus, the laser object light LB and the reference light interfere with each other on the photosensitive material 107 so that an interference fringe is recorded on the photosensitive material 107. The area of the photosensitive material 107 that is irradiated by the laser object light LB and the reference light is smaller than the total area of the photosensitive material 107, and the exposure is repeated while the exposure area of the photosensitive material 107 is changed in a stepwise manner. In this manner, the interference fringe is recorded on the entire photosensitive material 107.

In the prior art hologram manufacturing apparatus, however, in order to change the exposure area of the photosensitive material 107 in a stepwise manner, the exposure table 105 is rotated by the lateral turning member 102 and the longitudinal turning member 104 to change the angle of incidence of the laser object light LB and the reference light to the photosensitive material 107. The first and second mirrors 108 and 109 are rotated to change the essential point light source position of the laser object light LB (same for the reference light), and the movable stage 113 is moved horizontally and vertically relative to the exposure table 105 to change the area irradiated by the laser object light LB (same for the reference light). The apparatus has the following problems.

(1) Since the area irradiated by the laser object light LB and the reference light is moved by mechanical parts and the photosensitive material 107 is also driven, a positioning error due to vibration easily occurs.

(2) Freedom of design is small because the shapes of the apertured holder $106_1$ and $106_2$ are not easy to change and a complex shape such as a circle or oval is not easy to make.

(3) Since the irradiated area cannot be successively removed, discontinuity easily occurs in the interference fringe of the hologram at the boundary of the irradiation areas of the laser object light LB and the reference light.

SUMMARY OF THE INVENTION

It is an object of the present invention to provide a hologram manufacturing apparatus and method using a step and repeat exposure method, which provides good continuity at an interference fringe of a hologram and allows a large freedom of design.

The hologram manufacturing apparatus of the present invention for manufacturing a hologram optical element by a step and repeat exposure method comprises light shielding means having a spatial light modulator whose light transmissive area and light non-transmissive area are controlled corresponding to an input signal, and drive means for driving the spatial light modulator by supplying the signal to the spatial light modulator. The light shielding means is arranged close to a photosensitive material.

BRIEF DESCRIPTION OF THE DRAWINGS

FIG. 4 shows a structure of a liquid crystal device shown in FIG. 2, FIGS. 5A and 5B illustrate operations of manufacturing a hologram optical element by a two-step and repeat exposure method by using the hologram manufacturing apparatus shown in FIG. 2, in which

DETAILED DESCRIPTION OF THE PREFERRED EMBODIMENTS

Figure 1:
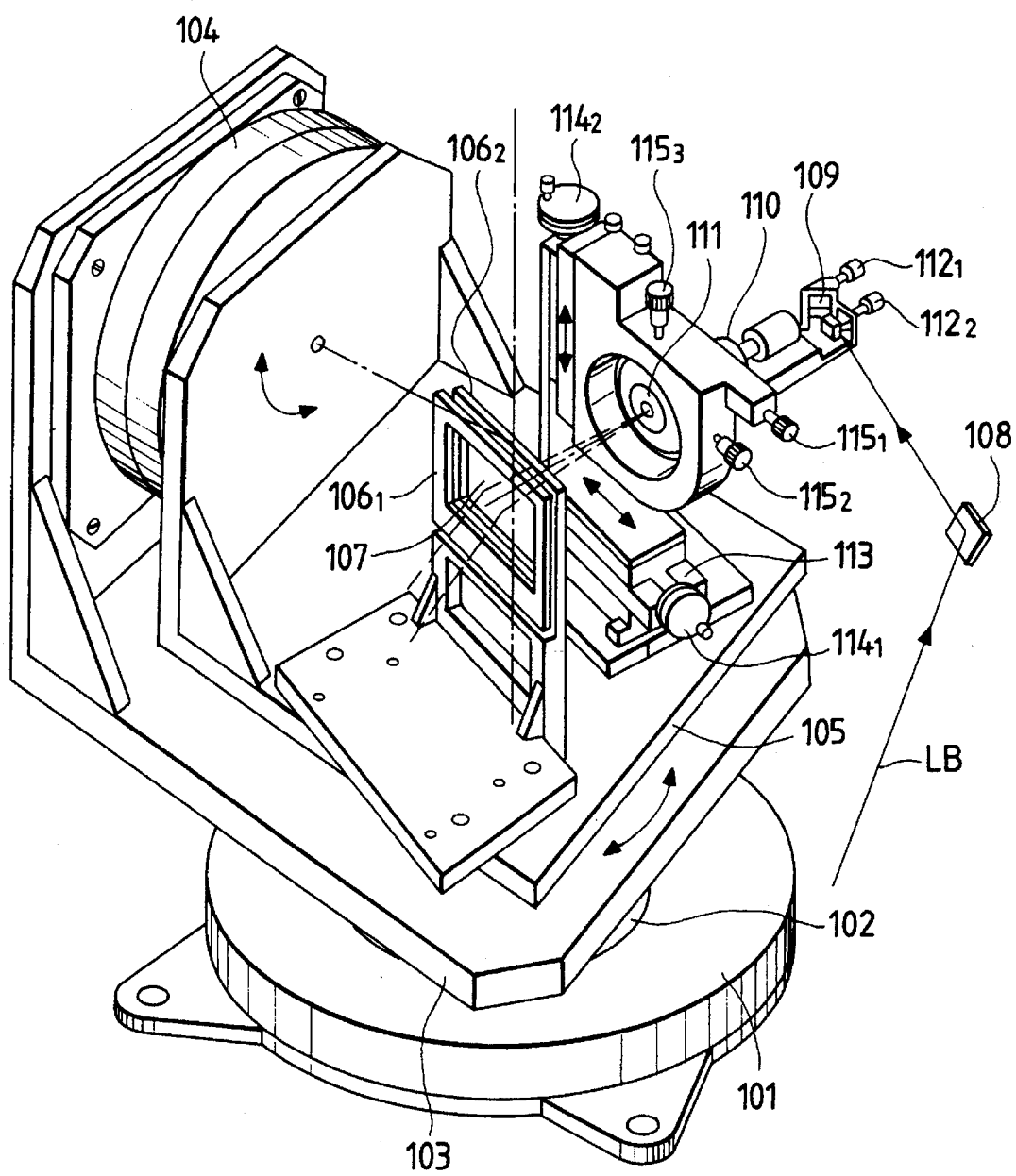
FIG. 1 shows a prior art hologram manufacturing apparatus for manufacturing a hologram optical element by a step and repeat exposure method.
Figure 2:
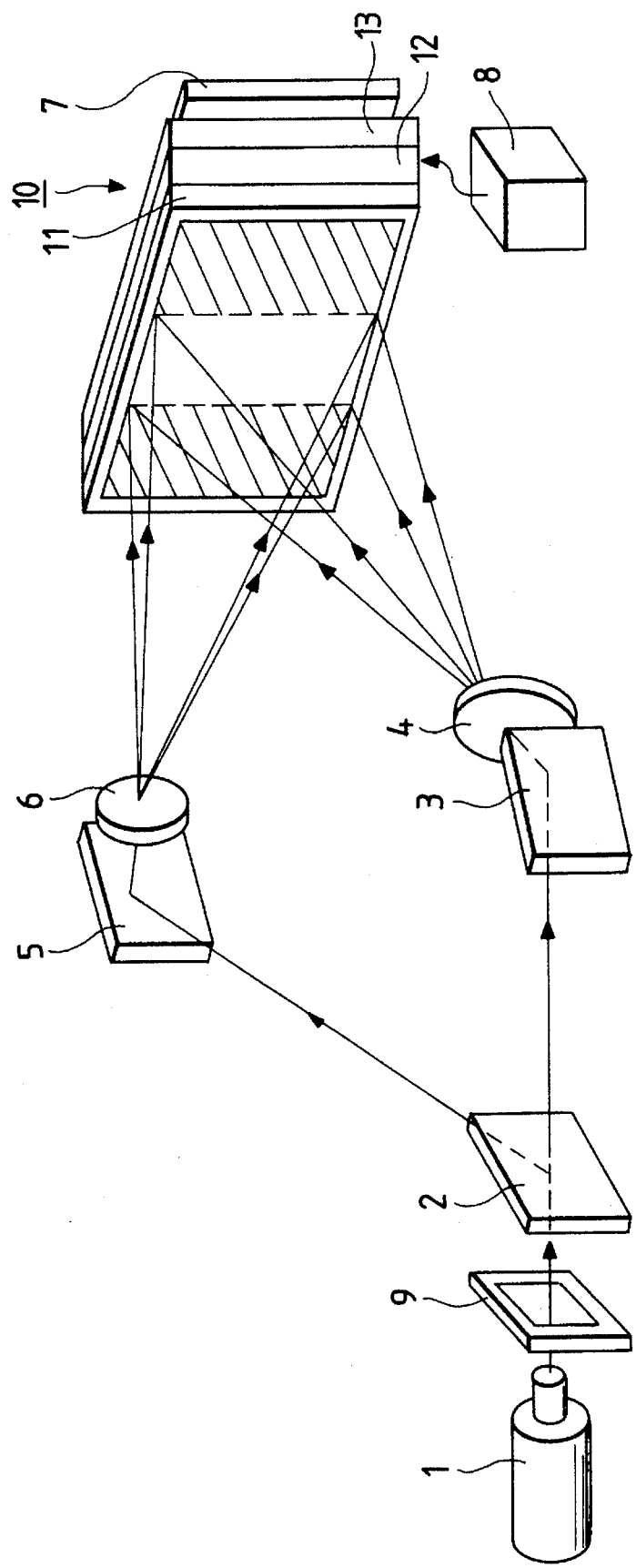
FIG. 2 shows a first embodiment of a hologram manufacturing apparatus of the present invention.

FIG. 2 shows a schematic configuration of a first embodiment of the hologram manufacturing apparatus of the present invention.

The hologram manufacturing apparatus of the present invention exposes by step and repeat a transmission type hologram by using a liquid crystal device as a spatial light modulator, and comprises a laser light source 1 for emitting a linearly polarized light, a half-mirror 2 for bisecting the linearly polarized light emitted from the laser light source 1, a first mirror 3 for reflecting the linearly polarized light transmitted through the half-mirror 2, and a first objective lens 4 for converting the linearly polarized light reflected by the first mirror 3 to linearly polarized divergent light having a desired wave plane. The apparatus also comprises a second mirror 5 for reflecting the linearly polarized light reflected by the half-mirror 2, and a second objective lens 6 for converting the linearly polarized light reflected by the second mirror 5 to linearly polarized divergent light having a desired wave plane. The apparatus further comprises a liquid crystal shutter 10 to which the linearly polarized lights are directed from the first and second objective lenses 4 and 6, and a photosensitive material 7 to which each linearly polarized light that is transmitted through the liquid crystal shutter 10 is directed. The liquid crystal shutter 10 comprises a polarizer 11, a liquid crystal device 12 and an analyzer 13, and the liquid crystal device 12 is driven by a driver 8. A mechanical shutter 9 is arranged between the laser light source 1 and the half-mirror 2 so that the light exposure may be stopped during aperture controlling and virtual point light source positioning to be described below.

The desired wave front is a wave front of a light beam which prevents the occurrence of aberration when a hologram is reproduced. It depends on the conditions of reproduction and may be scattered light or light having a predetermined aberration and the like.

Figure 3:
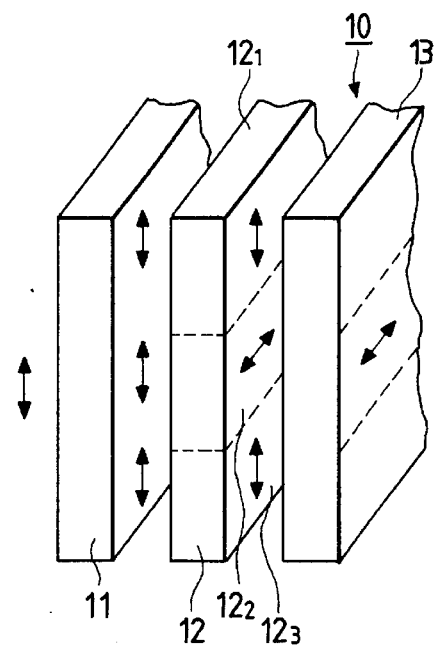
FIG. 3 illustrates an operation of a liquid crystal shutter shown in FIG. 2.

FIG. 3 shows an operation of the liquid crystal shutter 10 shown in FIG. 2.

The polarizer 11 comprises a polarization plate which has a characteristic of transmitting only the linearly polarized light (having a direction of polarization along a vertical direction in the drawing) emitted from the laser light source 1 and restoring the original linear polarization of the light when the polarization state of each linearly polarized light from the first and second objective lenses 4 and 6 has been changed by the optical system, including from the laser light source 1 to the polarizer 11. Namely, the directions of polarization of each linearly polarized light from the first and second objective lenses 4 and 6 is aligned vertically (parallel to the plane of incidence of the liquid crystal device 12) when those lights pass through the polarizer 11.

The liquid crystal device comprises a general TN liquid crystal which has a property of rotating a direction of polarization of the incident light by approximately 90 degrees parallel to the plane of incidence of the liquid crystal device 12. Accordingly, of the total linearly polarized light transmitted through the polarizer 11, the light directed to an area $12_2$ at which an applied voltage to the liquid crystal device 12 is off is converted to a linearly polarized light having a direction of polarization as shown and then directed to the analyzer 13. On the other hand, of the total linearly polarized light transmitted through the polarizer 11, the light directed to areas $12_1$ and $12_3$ at which the applied voltage of the liquid crystal 12 is on, does not have the direction of polarization thereof changed and directed to the analyzer 13.

The analyzer 13 comprises an analyzer plate having a property of transmitting only a polarized light having the direction of polarization as shown by the arrow. Accordingly, of the total linearly polarized light transmitted through the polarizer 11, only the light directed to the area of the liquid crystal device 12 that has no applied voltage area $12_2$, exits from the analyzer 13, and the light directed to areas $12_1$ and $12_3$ of the liquid crystal device 12, which have voltage applied, is blocked by the analyzer 13. However, when it is designed that both the polarizer 11 and the analyzer 13 transmit polarized light of the same direction of polarization, the light directed to areas $12_1$ and $12_3$, which have voltage applied, exit from the analyzer 13.

Figure 4:
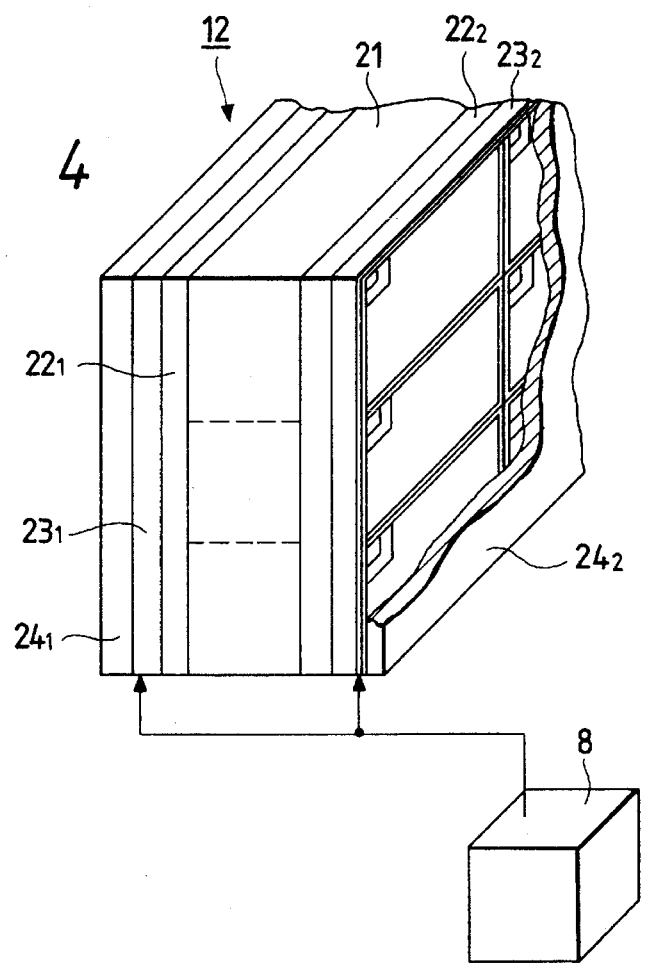

FIG. 4 shows a structure of the liquid crystal device 12.

The liquid crystal device 12 comprises a liquid crystal 21, first and second orientation films $22_1$ and $22_2$ arranged to hold the liquid crystal 21 therebetween for orienting liquid crystal molecules, first and second transparent electrodes $23_1$ and $23_2$ arranged on the opposite sides of the orientation films $22_1$ and $22_2$ with respect to the liquid crystal 21, and first and second glass plates $24_1$ and $24_2$ on opposite sides with respect to the liquid crystal 21 of the transparent electrodes $23_1$ and $23_2$. The first and second transparent electrodes $23_1$ and $23_2$ comprise arrays of the same shape to conform to the decided areas, and applied voltages are supplied to the divided areas from the driver 8. Accordingly, the rotation of the direction of polarization by the liquid crystal 21 disappears only in the area where the applied voltage is supplied from the driver 8, and the light non-transmittance property (incident light blocking property) is attained by a combination with the analyzer 13. Thus, by controlling the applied voltages to be supplied to the transparent electrodes $23_1$ and $23_2$ to change the areas of the liquid crystal 21 which exhibit the light transmittance and the light non-transmittance, the aperture of the liquid crystal device 12 (that is, the aperture of the liquid crystal shutter 10) can be changed as desired.

The photosensitive material 7 is arranged close to the liquid crystal shutter 10 to face the liquid crystal shutter 10, as shown in FIG. 2. The photosensitive material 7 is exposed to the linearly polarized light from the first and second objective lenses 4 and 6 that is transmitted through the liquid crystal shutter 10 so that an interference fringe is recorded on the photosensitive material 7. Since the liquid crystal shutter 10 is sufficiently thin and the photosensitive material 7 is arranged close to the liquid crystal shutter 10, even if the linearly polarized light directed through the first and second objective lenses 4 and 6 are directed to the photosensitive material 7 at an acute angle, the position and shape of the irradiation of the linearly polarized light to the photosensitive material 7 and the position and shape of the aperture of the liquid crystal shutter 10 do not substantially shift from each other. If it is desired to overcome such a slight shift, then the shift of the position and shape of the aperture are previously calculated based on the incident angles of the linearly polarized light and the thickness of the liquid crystal shutter 10 and these values are inputted to the driver 8.

An operation of manufacturing the hologram optical element by the step and repeat exposure method by using the hologram manufacturing apparatus shown in FIG. 2 is now explained with reference to FIGS. 5A and 5B.

Figure 5A:
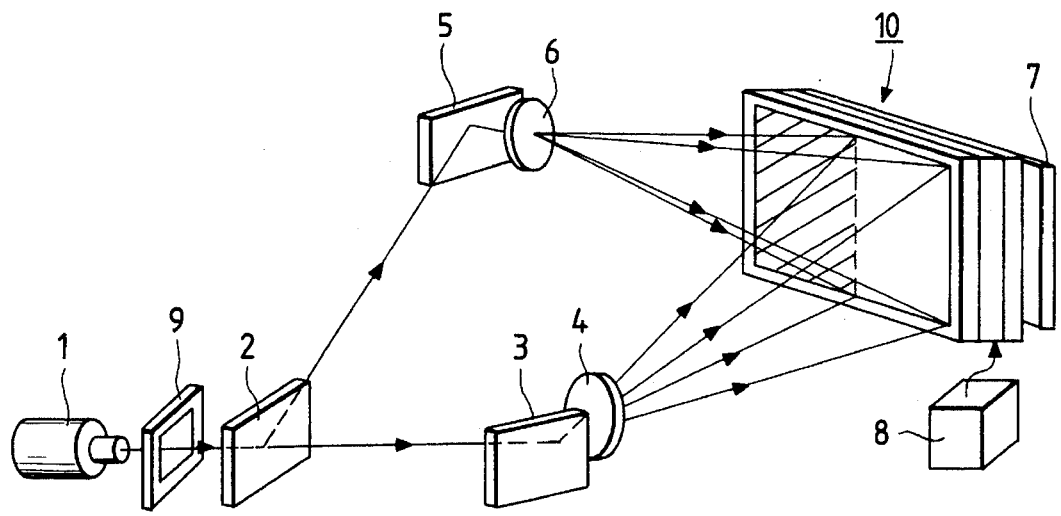
FIG. 5A illustrates an operation of exposing a right half of a photosensitive material and FIG. 5B illustrates an operation of exposing a left half of the photosensitive material.

When a right half in FIG. 5A of the photosensitive material 7 is to be exposed to record an interference fringe, as shown in the FIG. 5a, the right half of the liquid crystal shutter 10 is opened by the driver 8 and the positions and the angles of the first and second mirrors 3 and 5 and the first and second objective lenses 4 and 6 are changed to direct the linearly polarized light emitted from the first and second objective lenses 4 and 6 to the right half of the liquid crystal shutter 10. On the other hand, when the left half of the photosensitive material 7 is to be exposed to record an interference fringe, as shown in FIG. 5B, the left half of the liquid crystal shutter 10 is opened by the driver 8 and the positions and the angles of the first and second mirrors 3 and 5, and the first and second objective lenses 4 and 6 are changed to direct the linearly polarized light emitted from the first and second objective lenses 4 and 6 to the left half of the liquid crystal shutter 10. In this manner, the right half and the left half of the photosensitive material 7 can be exposed by an ideal exposure optical system. When the aperture of the liquid crystal shutter 10 is to be changed (aperture controlling) and the positions of the objective lenses 4 and 6 and the mirrors 3 and 5 are to be changed (virtual point light source positioning), the mechanical shutter 9 is closed to prevent the photosensitive material 7 from being exposed.

In the present embodiment, the linearly polarized light may be directed to the entire liquid crystal shutter 10 without changing the irradiation area and the irradiation area may be changed by the aperture of the liquid crystal shutter 10. In this case, a desired light beam corresponding to the position of the aperture irradiates the entire liquid crystal shutter 10.

In the hologram manufacturing apparatus of the present embodiment, since the step and repeat exposure is carried out by using the liquid crystal shutter 10, any positioning error between the irradiation area and the photosensitive material 7 due to vibration from the movement of the aperture, as occurred in the prior art hologram manufacturing apparatus, can be prevented.

The polarizer 11 of the liquid crystal shutter 10 may be omitted when there is no disturbance of the direction of polarization of the polarized light in the optical system from the laser light source 1 to the liquid crystal shutter 10. When the photosensitive material 7 is irradiated by a polarized light having a P-polarized light with respect to the plane of incidence, the contrast of the interference fringe is generally high. Accordingly, the direction of polarization of the linearly polarized light emitted from the liquid crystal shutter 10 is preferably normal to the exit plane of the liquid crystal shutter 10, as shown in FIG. 3, rather than parallel to the exit plane of the liquid crystal shutter 10.

Figure 6:
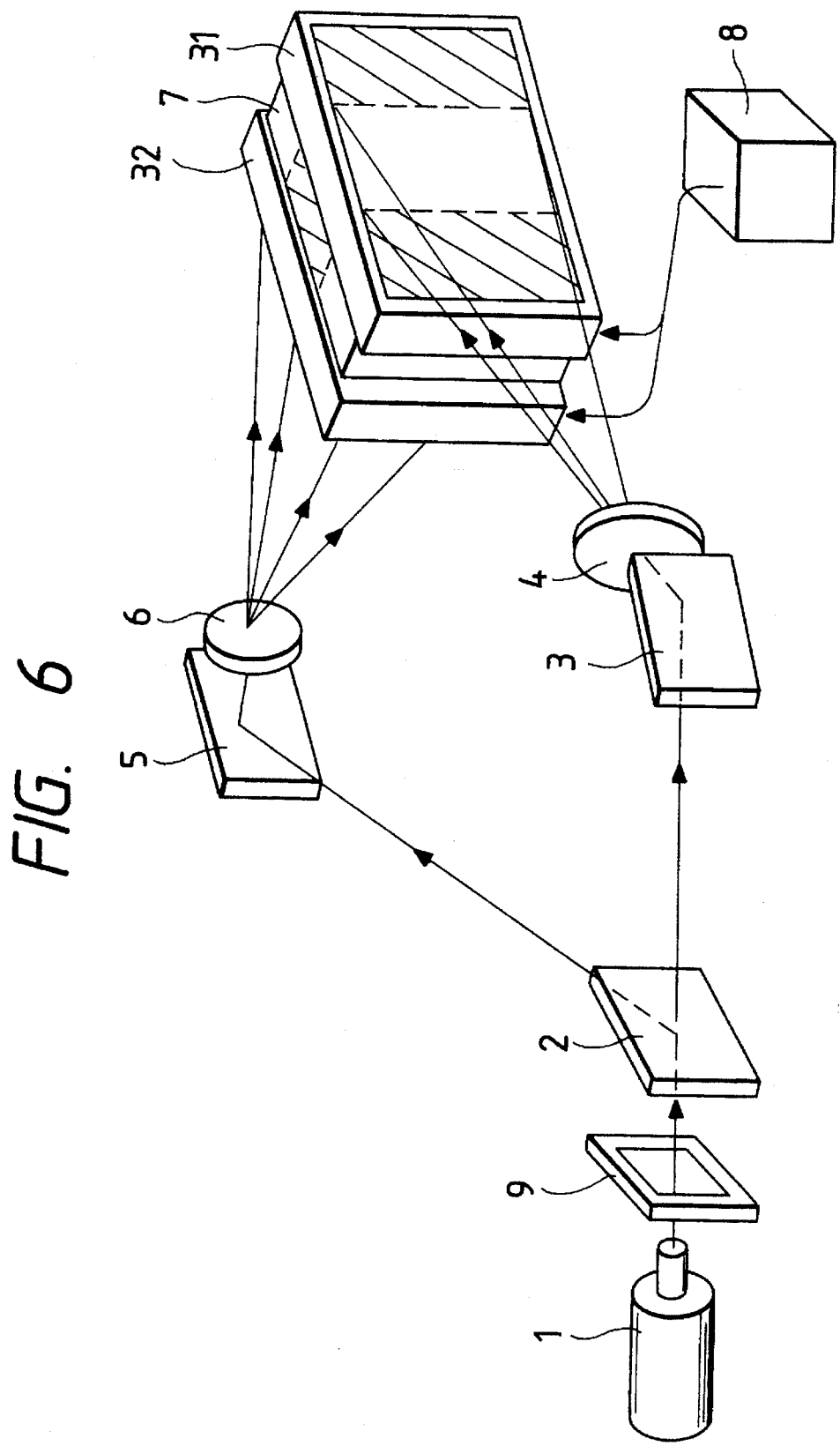
FIG. 6 shows a schematic configuration of a third embodiment of the hologram manufacturing apparatus of the present invention.

FIG. 6 shows a schematic configuration of a second embodiment of the hologram manufacturing apparatus of the present invention.

The hologram manufacturing apparatus of the present invention step and repeat-exposes to make a reflection type hologram by using liquid crystal device as a spatial light modulator. It is different from the hologram manufacturing apparatus of FIG. 2 in the first and second liquid crystal shutters 31 and 32 are arranged to hold a photosensitive material 7 therebetween. A linearly polarized light emitted from a first objective lens 4 is directed to the photosensitive material 7 through the first liquid crystal shutter 31, and a linearly polarized light emitted from a second objective lens 6 is directed to the photosensitive material 7 through the second liquid crystal shutter 32.

The first and second liquid crystal shutters 31 and 32 have the same structure as that of the liquid crystal shutter 10 shown in FIG. 2, and the apertures thereof are controlled by the driver 8 such that the linearly polarized light emitted from the objective lenses 4 and 6 are directed to the same position on the photosensitive material 7 in the same shape. In order to prevent the shift of position of the linearly polarized light directed to the photosensitive material 7 at an acute angle, the first and second liquid crystal shutters 31 and 32 are formed sufficiently thin and arranged close to the photosensitive material 7.

Figure 7:
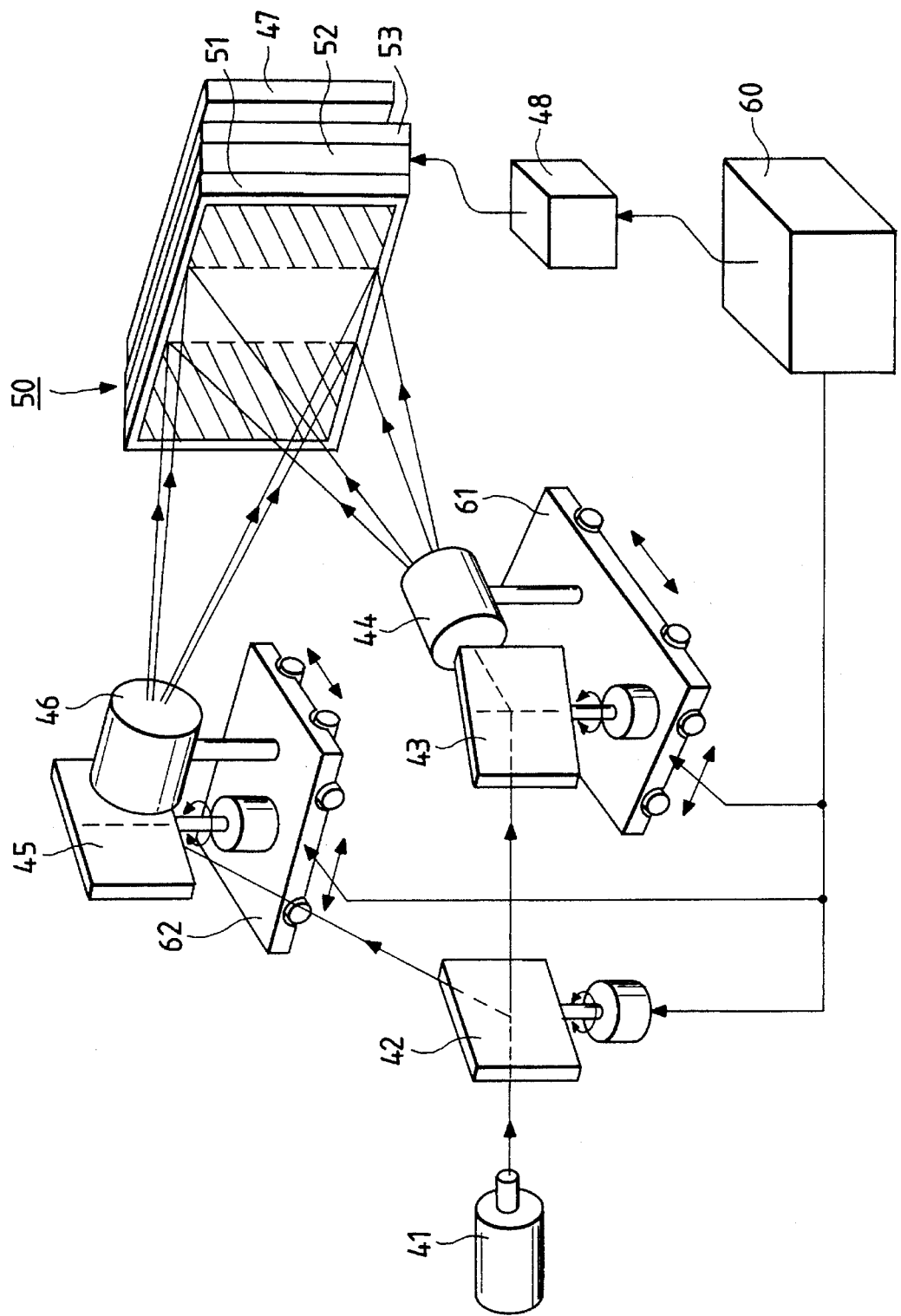
FIG. 7 shows schematic configuration of a third embodiment of the hologram manufacturing apparatus of the present invention.

FIG. 7 shows a schematic configuration of a third embodiment of the hologram manufacturing apparatus of the present invention.

The hologram manufacturing apparatus of the present embodiment step and repeat-exposes a transmission type hologram by using a liquid crystal device as the spatial light modulator and eliminates the discontinuity of the interference fringe between split areas.

The hologram manufacturing apparatus of the present embodiment comprises a laser light source 41 for emitting a linearly polarized light, a galvano half-mirror 42 rotatable around an axis normal to an optical axis of the linearly polarized light for bisecting the linearly polarized light emitted from the laser light source 41, a first galvano mirror 43 rotatable around an axis normal to the optical axis of the linearly polarized light for reflecting the linearly polarized light transmitted through the galvano half-mirror 42, a first zoom lens 44 for converting the linearly polarized light reflected by the first galvano mirror 43 to a linearly polarized light having a desired wave plane, and a first moving table 61 on which the first galvano mirror 43 and the first zoom lens 44 are mounted. The apparatus also comprises a second galvano mirror 45 rotatable around an axis normal to the optical axis of the linearly polarized light for reflecting the linearly polarized light reflected by the galvano half-mirror 42, a second zoom lens 46 for converting the linearly polarized light reflected by the second galvano mirror 45 to a linearly polarized light having a desired wave plan, and a second moving table 62 on which the second galvano mirror 45 and the second zoom lens 46 are mounted. The apparatus further comprises a liquid crystal shutter 50 including a polarizer 51, a liquid crystal device 52 and an analyzer 53, to which the linearly polarized lights from the first and second zoom lenses 44 and 46 are directed, a photosensitive device 47 to which the linearly polarized light transmitted through the liquid crystal shutter 50 are directed, a driver 48 for driving the liquid crystal device 52 and a controller 60 for controlling the rotations of the galvano half-mirror 42 and the first and second galvano mirrors 43 and 45, the focal distances of the first and second zoom lenses 46 and 47 and the movements of the first and second moving tables 61 and 62.

Figure 8:
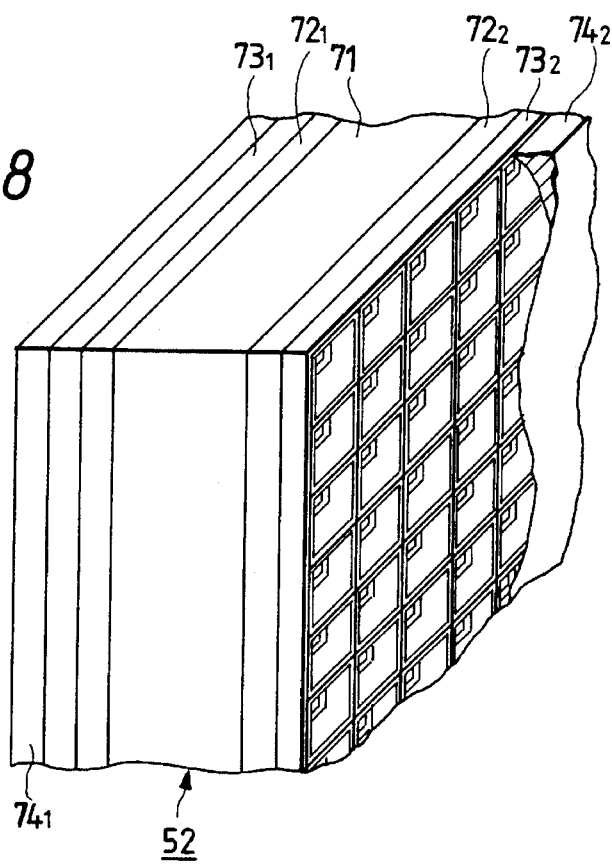
FIG. 8 shows a structure of liquid crystal device shown in FIG. 7.

As shown in FIG. 8, the liquid crystal device 52, which is one component of the liquid crystal shutter 50, comprises a liquid crystal 71, first and second orientation films $72_1$ and $72_2$ for orienting liquid molecules and arranged to sandwich the liquid crystal 71 therebetween, first and second transparent electrodes $73_1$ and $73_2$ arranged on the opposite sides of the orientation films $72_1$ and $72_2$ with respect to the liquid crystal 71 and first and second glass plates $74_1$ and $74_2$ arranged on the opposite sides of the transparent electrodes $73_1$ and $73_2$ with respect to the liquid crystal, as does the liquid crystal device 12 shown in FIG. 4. The liquid crystal device 52 however differs from the liquid crystal device 12 shown in FIG. 4 in that the first and second transparent electrodes $73_1$ and $73_2$ for applying voltages to the liquid crystal 71 are finely divided in a matrix like a liquid crystal television so that the light transmittance and the light non-transmittance are controlled more finely.

In the hologram manufacturing apparatus of the present embodiment, the discontinuity of an interference fringe is prevented by controlling the aperture of the liquid crystal shutter 50 for defining the divided area and the light exposure by continuously moving the essential point light source position of the linearly polarized light directed to the liquid crystal shutter 50 along a locus previously calculated. The essential point light source position is moved by continuously rotating the galvano half-mirror 42, the first galvano mirror 43 and the second galvano mirror 45 by the controller 60 to continuously change the focal distance of the first zoom lens 44 and the focal distance of the second zoom lens 46 and continuously moving the first moving table 61 and the second moving table 62. The aperture of the liquid crystal shutter 50 is controlled by changing a distribution of the applied voltage supplied from the driver 48, by the controller 60.

Figure 9:
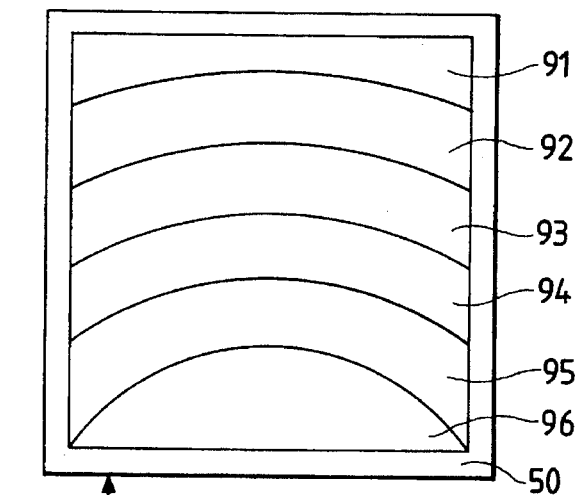
FIG. 9 shows a schematic configuration of a fourth embodiment of the hologram manufacturing apparatus of the present invention.

FIG. 9 shows a schematic configuration of a fourth embodiment of the hologram manufacturing apparatus of the present invention.

Figure 5B:
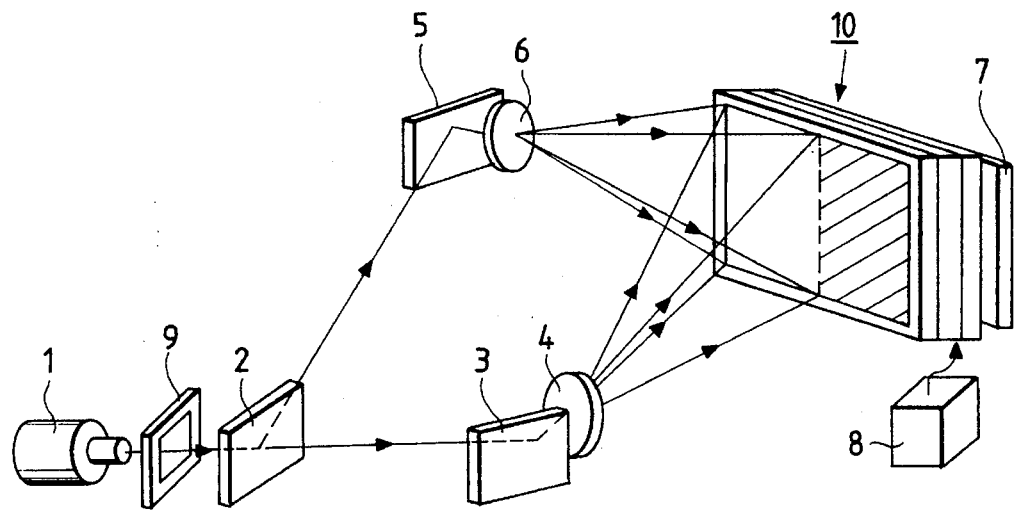

In the hologram manufacturing apparatus shown in FIG. 2, the shape of the aperture of the liquid crystal shutter 10 is rectangular, as shown in FIGS. 5A and 5B. In the hologram manufacturing apparatus as shown in FIG. 7, which has the liquid crystal shutter 50 to permit fine control of the light transmittance and the light non-transmittance, the drive voltage supplied from the driver 48 may be controlled by the controller 60 such that the aperture of the liquid crystal shutter 50 has the first to sixth apertures 91–96 shown in FIG. 9, having different radii of arcs. In this manner, freedom in the step and repeat design is remarkably enhanced.

In the above description, with the light shield means arranged close to the photosensitive material, is provided the liquid crystal shutter. Alternatively, the light shield means may be a space modulation device that uses other than the liquid crystal whose light transmittance and light non-transmittance are controlled corresponding to an input signal (a signal supplied from the drive means).

The present invention is not limited to the above embodiments and various modifications thereof may be made without departing from the spirit of the present invention.

In accordance with the present invention, the exposure area can be changed as desired in the step and repeat exposure of the hologram. Accordingly, the freedom of design can be made wider and any positioning error of the exposure area due to vibration is eliminated. Further, since the exposure area may be continuously changed and the states of the wave fronts of the object light and the reference light directed to the photosensitive material can be continuously changed in accordance with the exposure area, the continuity of the interference fringe of the hologram can be maintained over the entire photosensitive material.

What is claimed is:

1. A hologram manufacturing apparatus for manufacturing a hologram optical element by a step and repeat exposure method, comprising:

light shield means for controlling transmission of a reference light beam and an object light beam, which each have a wavefront, to a photosensitive material, said light shield means including a spatial light modulator, having a light transmission area and a light non-transmission area thereof, which is controlled in accordance with an input signal;

drive means for driving said spatial light modulator by supplying the input signal to the spatial light modulators, wherein said drive means moves a position of the light transmission area and changes a shape of the light transmission area; and moving means for moving the essential point light source position of the reference light beam and the object light beam, which are incident on the light transmission area, in accordance with the light beam transmission control by said light shield means.

2. A hologram manufacturing apparatus according to claim 1, wherein the spatial light modulator comprises a liquid crystal panel.

3. A hologram manufacturing apparatus for manufacturing a hologram optical device by a step and repeat exposure method, said apparatus comprising:

a light source for emitting a coherent light beam;

a beam splitter having a variable split plane angle for splitting the coherent light beam emitted from said light source;

a first mirror having a variable reflection plane angle for reflecting one of the light beams split by said beam splitter;

a first optical system for converting the light beam reflected by said first mirror to a reference light beam having a wavefront;

a first movable table for mounting thereon said first mirror and said first optical system;

a second mirror having a variable reflection plane angle for reflecting the other of the light beams split by said beam splitter;

a second optical system for converting the light beam reflected by said second mirror to an object light beam having a wavefront;

a second movable table for mounting thereon said second mirror and said second optical system;

light shield means for controlling transmission of the reference light beam and the object light beam to a photosensitive material, and being arranged close to the photosensitive material to which the light beams from said first optical system and said second optical system are directed, said light shield means including a spatial light modulator, having a light transmission area and a light non-transmission area thereof, which is controlled in accordance with an input signal;

drive means for driving the spatial light modulator by supplying the input signal to the spatial light modulator, wherein said drive means moves a position of the light transmission area and changes a shape of the light transmission area; and controlling means for controlling an inclination of the split plane of said beam splitter, inclinations of the reflection planes of said first mirror and said second mirror, said first optical system and said second optical system, movements of said first movable table and said second movable table and said input signal, so that the wavefronts of the reference light beam and the object light beam, which are incident on said light transmission area, change direction in accordance with the light beam transmission control by said light shield means.

4. A hologram manufacturing apparatus according to claim 3, wherein the spatial light modulator comprises a liquid crystal panel.

5. A hologram manufacturing apparatus according to claim 3, wherein said beam splitter comprises a half mirror.

6. A hologram manufacturing apparatus according to claim 3, wherein the wavefronts of the reference light beam and the object light beam are divergent wavefronts.

7. A hologram manufacturing apparatus according to claim 3, wherein the wavefronts of the reference beam and the object light beam have a predetermined aberration.

8. A hologram manufacturing method for manufacturing a hologram optical device by a step and repeat exposure method, comprising the steps of:

driving a spatial light modulator by supplying a signal to the spatial light modulator;

changing a light transmission area and a light non-transmission area stepwise or continuously in accordance with the signal by light shield means, which is arranged close to a photosensitive material, wherein the light shield means includes the spatial light modulator, and said driving step moves a position of light transmission area and changes a shape of the light transmission area;

moving the essential point light source position of the reference light beam and the object beam, which are incident on the transmission area, in accordance with said changing of the light transmission area and the non-transmission area; and exposing the light transmission area with the wavefronts of the reference light beam and the object light beam.

9. A hologram manufacturing method for manufacturing a hologram optical device by a step and repeat exposure method, comprising the steps of:

emitting a coherent light beam;

splitting the coherent light beam into two light beams travelling in desired directions determined by control means;

moving an optical system, for directing the split light beams to a photosensitive material, to a predetermined position in accordance with the desired directions of the two light beams, wherein one of the two light beams is converted to a reference light beam, and the other of the two light beams is converted to an object light beam;

changing a light transmission area and a light non-transmission area of a spatial light modulator that is arranged close to the photosensitive material, stepwise or continuously in accordance with an input signal from the control means, wherein said control means moves a position of the light transmission area and changes a shape of the light transmission area; and changing direction of wavefronts of the reference light beam and the object light beam, which are incident on the light transmission area, in accordance with said changing of the light transmission area and the non-transmission area.

* * * * *

UNITED STATES PATENT AND TRADEMARK OFFICE
CERTIFICATE OF CORRECTION

PATENT NO. : 5,502,581
DATED : March 26, 1996
INVENTOR(S) : TOSHIYUKI SUDO, et al.

It is certified that error appears in the above-indentified patent and that said Letters Patent is hereby corrected as shown below:

COLUMN 1

Line 5, "Nov. 27, 1992," should read --Nov. 24, 1992,--.

COLUMN 8

Line 25, "tors," should read --tor,--.

COLUMN 10

Line 5, "object beam" should read --object light beam--.

Signed and Sealed this

Sixth Day of August, 1996

Attest:

BRUCE LEHMAN

*Attesting Officer*  *Commissioner of Patents and Trademarks*